US012570869B2

(12) United States Patent
Kim et al.

(10) Patent No.: US 12,570,869 B2
(45) Date of Patent: Mar. 10, 2026

(54) PROTECTIVE FILM, TRAY ASSEMBLY AND COATING COMPOSITION

(71) Applicant: Samsung Display Co., LTD., Yongin-si (KR)

(72) Inventors: Sung Kim, Anyang-si (KR); Hyung Don Na, Seoul (KR)

(73) Assignee: Samsung Display Co., LTD., Yongin-si (KR)

( * ) Notice: Subject to any disclaimer, the term of this patent is extended or adjusted under 35 U.S.C. 154(b) by 834 days.

(21) Appl. No.: 17/475,979

(22) Filed: Sep. 15, 2021

(65) Prior Publication Data

US 2022/0145117 A1    May 12, 2022

(30) Foreign Application Priority Data

Nov. 10, 2020    (KR) ........................ 10-2020-0149362

(51) Int. Cl.
*C09D 133/08* (2006.01)
*C03C 17/32* (2006.01)
(Continued)

(52) U.S. Cl.
CPC ............ *C09D 133/08* (2013.01); *C03C 17/32* (2013.01); *C09D 7/63* (2018.01); *C09D 7/69* (2018.01);
(Continued)

(58) Field of Classification Search
CPC .......... C09D 133/08; C09D 7/63; C09D 7/69; C09D 7/70; C09D 5/00; C09D 7/65; C09D 133/12; C09D 175/04; C09D 133/066; C09D 133/06; C03C 17/32;

G02F 1/133311; C08F 220/14; C08F 220/1804; C08F 220/28; C08G 18/6225; C08G 18/792; C08J 7/0427; C08J 2323/06;
(Continued)

(56) References Cited

U.S. PATENT DOCUMENTS 4,931,330 A      6/1990  Stier et al.
5,650,213 A  *  7/1997  Rizika .................... G02B 5/128
                                                        427/163.4
(Continued)

FOREIGN PATENT DOCUMENTS

CN          104937053 A      9/2015
EP          1 178 152        2/2004
(Continued)

OTHER PUBLICATIONS

IP.com English translation for Takeuchi Naoya et al (JP 2019064010 A) (Year: 2019).*
(Continued)

*Primary Examiner* — Nathan L Van Sell
(74) *Attorney, Agent, or Firm* — F. CHAU & ASSOCIATES, LLC

(57)                        ABSTRACT

A protective film includes a film, and a coating layer disposed on the film. The coating layer includes a binder, and beads disposed in the binder. The binder includes a protrusion portion in contact with each of the beads, and a flat portion not in contact with the beads. A tray assembly includes a tray and the coating layer disposed on the tray. A coating composition includes a binder and urethan beads disposed in the binder.

4 Claims, 16 Drawing Sheets

(51) Int. Cl.
   *C09D 7/40*         (2018.01)
   *C09D 7/63*         (2018.01)
   *G02F 1/1333*       (2006.01)

(52) U.S. Cl.
   CPC .......... *C09D 7/70* (2018.01); *G02F 1/133311*
   (2021.01)

(58) Field of Classification Search
   CPC ........................ C08J 2323/12; C08J 2325/06;
   C08J 2327/06; C08J 2333/12; C08J
   2367/02; C08J 2369/00; C08J 2381/06;
   C08J 2433/06; C08J 7/04; C08J 5/18;
   C08L 23/06; C08L 23/12; C08L 25/06;
   C08L 27/06; C08L 33/12; C08L 67/02;
   C08L 69/00; C08L 81/06
   See application file for complete search history.

(56)               References Cited

U.S. PATENT DOCUMENTS

| | | | | |
|---|---|---|---|---|
| 6,217,981 B1 * | 4/2001 | Kanno | ....................... | C09J 7/38 |
| | | | | 156/283 |
| 2011/0244084 A1 * | 10/2011 | Dhadda | ............... | B65D 5/4204 |
| | | | | 426/106 |

| | | | | |
|---|---|---|---|---|
| 2015/0259544 A1 | 9/2015 | Lee et al. | | |
| 2016/0208111 A1 * | 7/2016 | Hurley | .................. | B05D 1/005 |
| 2018/0022973 A1 | 1/2018 | Kim et al. | | |
| 2018/0320020 A1 | 11/2018 | Kim et al. | | |
| 2021/0253918 A1 | 8/2021 | Kim et al. | | |

FOREIGN PATENT DOCUMENTS

| | | | |
|---|---|---|---|
| JP | 1994-287525 | A2 | 10/1994 |
| JP | 2002-043920 | A2 | 8/2002 |
| JP | 2009-292894 | | 12/2009 |
| JP | 2019-064010 | A2 | 4/2019 |
| KR | 10-2007-0019694 | A | 2/2007 |
| KR | 10-2016-0092613 | | 8/2016 |
| KR | 10-2085500 | | 3/2020 |
| KR | 10-2021-0104945 | | 8/2021 |
| KR | 10-2022-0044022 | | 4/2022 |

OTHER PUBLICATIONS

Office Action dated Aug. 25, 2025 in related Korean Patent Application No. 10-2020-0149362, In Korean, 7 pages.
Office Action issued in corresponding Chinese Patent AppIn No. 202111303154.4 on Jan. 22, 2026.

\* cited by examiner

PROTECTIVE FILM, TRAY ASSEMBLY AND COATING COMPOSITION

CROSS-REFERENCE TO RELATED APPLICATION(S)

This application claims priority to and benefits of Korean Patent Application No. 10-2020-0149362 under 35 U.S.C. 119, filed on Nov. 10, 2020 in the Korean Intellectual Property Office, the entire contents of which are herein incorporated by reference.

BACKGROUND

1. Technical Field

The disclosure relates to a protective film, a tray assembly and a coating composition.

2. Description of the Related Art

The importance of display devices has steadily increased with the development of multimedia technology. In response thereto, various types of display devices such as an organic light emitting display (OLED), a liquid crystal display (LCD) and the like have been used. Such display devices have been applied to various mobile electronic devices, for example, portable electronic devices such as a smart phone, a smart watch, and a tablet PC.

In manufacturing, a display device may be transferred and stored while being loaded on a tray during various processes. A tray may include a loading space for loading a display device. In an attempt to prevent the display device from being damaged during transfer, the loading space of the tray may have a size corresponding to the size of the display device. In case that the display device moves in the loading space, the display device may be damaged by collision with neighboring components.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a protective film that may be adhered to a loading target element and that may have an excellent non-slip property with respect to a tray.

Aspects of the disclosure also provide a tray on which a loading target element may be stably loaded due to an anti-slip pad having an excellent non-slip property with respect to the loading target element.

Aspects of the disclosure also provide a coating composition that may be coated on an object such as a base film, a tray, or the like to exhibit an excellent non-slip property.

An embodiment of a protective film may include a film, and a coating layer disposed on the film. The coating layer may include a binder, and beads disposed in the binder. The binder may include a protrusion portion in contact with each of the beads, and a flat portion that may not be in contact with the beads.

The binder may have a glass transition temperature of about 0° C. to about 25° C.

The binder may include at least one of methyl methacrylate, butyl acrylate, and 2-hydroxyethyl methacrylate.

With respect to a total weight of the binder, the methyl methacrylate may have a weight ratio of about 42 wt % to about 58 wt %, the butyl acrylate may have a weight ratio of about 37 wt % to about 53 wt %, and the 2-hydroxyethyl methacrylate may have a weight ratio of about 4 wt % to about 6 wt %.

The protrusion portion may be surrounded by the flat portion.

A thickness of the protrusion portion may be smaller than a thickness of the flat portion.

An average thickness of the binder may be smaller than an average particle size of the beads.

The beads may have an average particle size of about 5 μm to about 10 μm.

The beads may include urethane beads.

A weight ratio of the beads to the coating layer may be about 9 wt % to about 11 wt %.

An embodiment of a tray assembly may include a tray, and a coating layer disposed on the tray. The coating layer may include a binder, and beads disposed in the binder. The binder may include a protrusion portion in contact with each of the beads, and a flat portion that may not be in contact with the beads.

The binder may have a glass transition temperature of about 0° C. to about 25° C.

The binder may include at least one of methyl methacrylate, butyl acrylate, and 2-hydroxyethyl methacrylate.

With respect to a total weight of the binder, the methyl methacrylate may have a weight ratio of about 42 wt % to about 58 wt %, the butyl acrylate may have a weight ratio of about 37 wt % to about 53 wt %, and the 2-hydroxyethyl methacrylate may have a weight ratio of about 4 wt % to about 6 wt %.

The beads may include urethane beads.

A weight ratio of the beads to the coating layer may be about 9 wt % to about 11 wt %.

An embodiment of a coating composition may include a binder, and urethane beads disposed in the binder. The binder may have a glass transition temperature of about 0° C. to about 25° C. A weight ratio of the urethane beads may be about 9 wt % to about 11 wt % with respect to the sum of weights of the binder and the urethane beads.

The binder may include at least one of methyl methacrylate, butyl acrylate, and 2-hydroxyethyl methacrylate.

With respect to a total weight of the binder, the methyl methacrylate may have a weight ratio of about 42 wt % to about 58 wt %, the butyl acrylate may have a weight ratio of about 37 wt % to about 53 wt %, and the 2-hydroxyethyl methacrylate may have a weight ratio of about 4 wt % to about 6 wt %.

The urethane beads may have an average particle size of about 5 μm to about 10 μm.

However, aspects of the disclosure are not restricted to those set forth herein. The above and other aspects of the disclosure will become more apparent to one of ordinary skill in the art to which the disclosure pertains by referencing the detailed description of the disclosure given below.

The protective film according to one embodiment may be adhered to the loading target element to prevent the loading target element loaded on the tray from slipping.

The tray according to one embodiment may allow the loading target element to be stably loaded thereon due to the anti-slip pad having an excellent non-slip property with respect to the loading target element.

The coating composition according to one embodiment may be coated on an object such as a base film, a tray, or the like to impart an excellent non-slip property to each object.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which:

FIG. 4 is a schematic perspective view showing a state in which a loading target element according to an embodiment is loaded on a tray;

FIGS. 8 and 9 are schematic views of the method of producing a first protective film according to an embodiment;

FIG. 13 is a schematic cross-sectional view taken along line XIII-XIII' of FIG. 12;

DETAILED DESCRIPTION OF THE EMBODIMENTS

Figure 1:
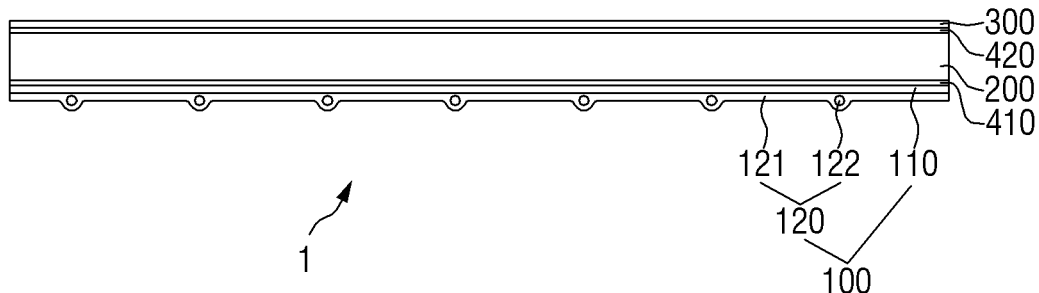
FIG. 1 is a schematic cross-sectional view of a loading target element according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well (and vice versa), unless the context clearly indicates otherwise.

When an element (e.g., a layer) is referred to as being "on" another element, it can be directly on the other element, or intervening layers may also be present. In contrast, when an element is referred to as being "directly on" another element, there may be no intervening elements present.

Spatially relative terms, such as "beneath," "below," "lower," "above," "upper" and the like, may be used herein for ease of description to describe one element or feature's relationship to another element(s) or feature(s) as illustrated in the figures. For example, some of the figures may depict an element's orientation relative to three directions (X, Y, and Z). It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

The same reference numbers indicate the same components throughout the specification.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Hereinafter, embodiments will be described in detail with reference to the accompanying drawings.

Figure 2:
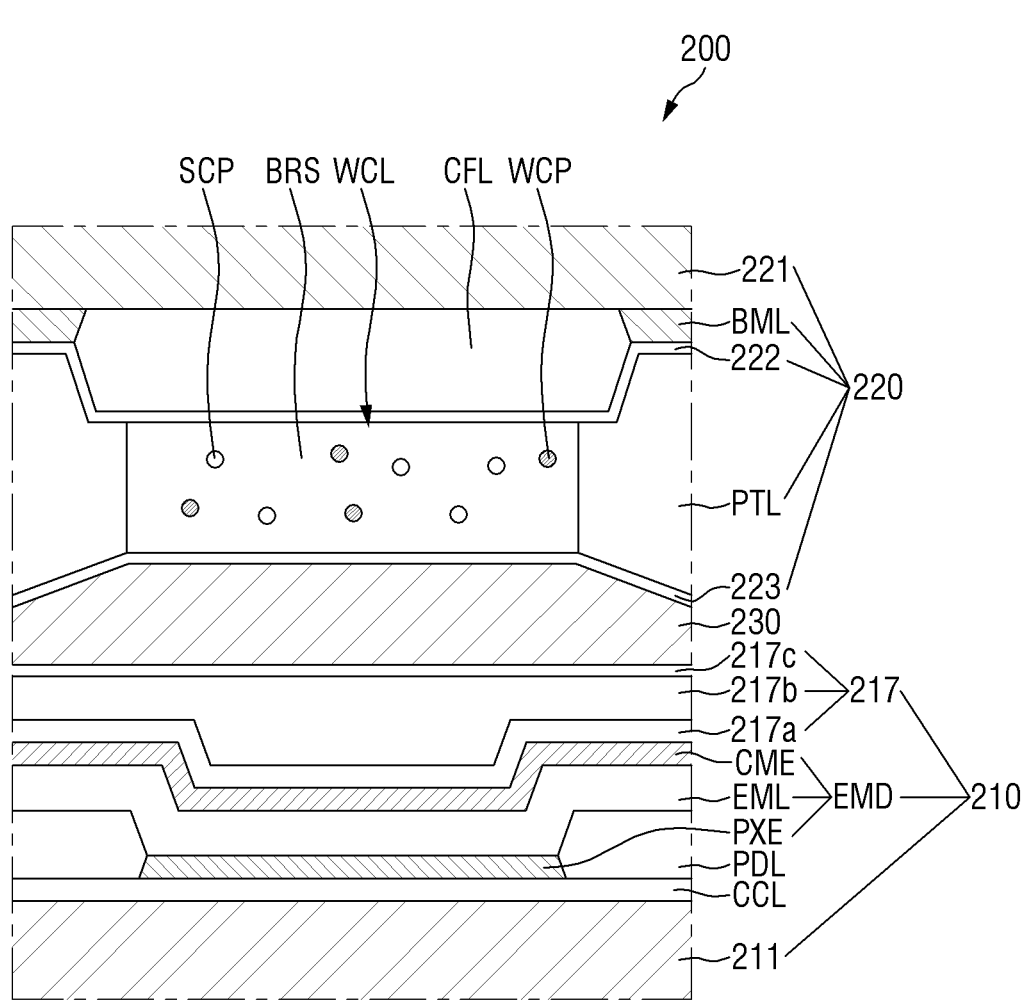
FIG. 2 is a schematic cross-sectional view of a pixel of a display device according to an embodiment.
Figure 3:
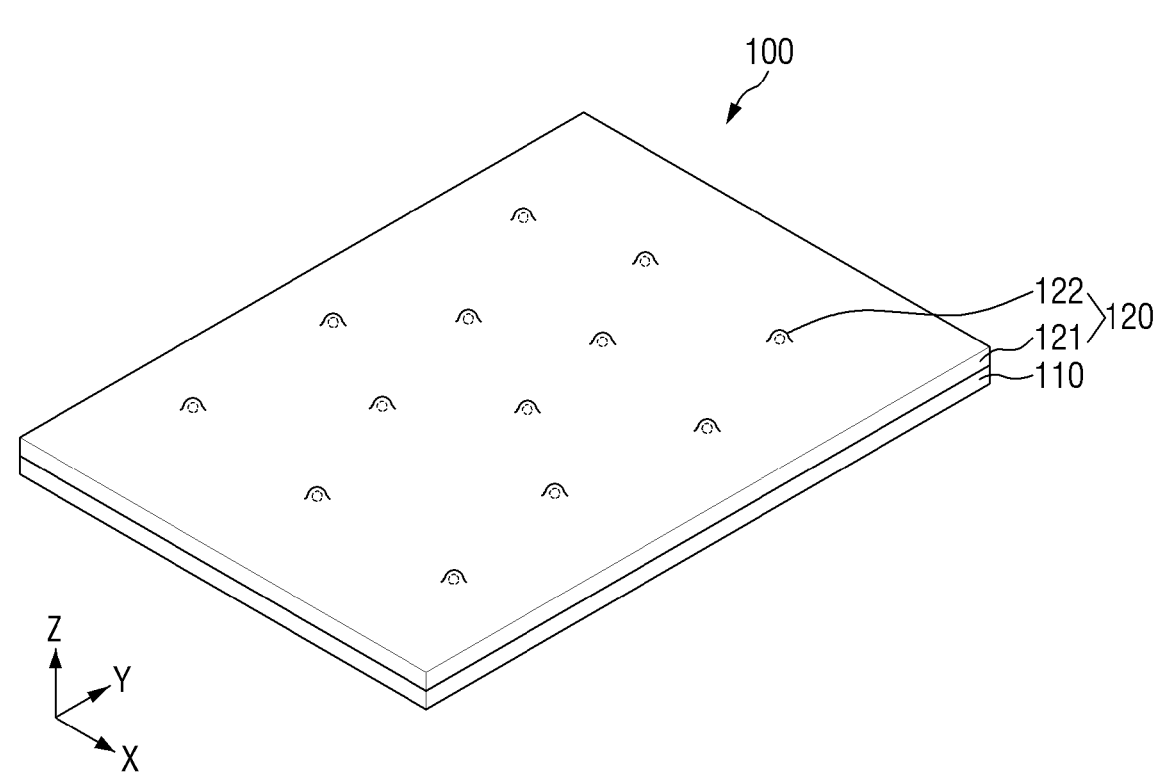
FIG. 3 is a schematic perspective view of a protective film according to an embodiment.

FIG. 1 is a schematic cross-sectional view of a loading target element according to an embodiment. FIG. 2 is a schematic cross-sectional view of a pixel of a display device according to an embodiment. FIG. 3 is a schematic perspective view of a protective film according to an embodiment.

Referring to FIGS. 1 to 3, a loading target element 1 may be an electronic element to which protective films 100 and 300 may be adhered, but the loading target element 1 is not limited thereto. As will be described later, the loading target element 1 may be transferred or stored while being loaded on a tray (see '500' of FIG. 4). In the following, a display device 200 will be described as an example of the electronic element included in the loading target element 1, but the electronic element is not limited thereto.

The loading target element 1 according to an embodiment may include the display device 200, a first protective film 100 disposed on a surface of the display device 200, and a second protective film 300 disposed on another surface of the display device 200.

The display device 200 may be a device for displaying a moving image or a still image. The display device 200 may be used as a display screen of various products such as televisions, laptop computers, monitors, billboards and the Internet of Things (IOT) as well as portable electronic devices such as mobile phones, smart phones, tablet personal computers (tablet PCs), smart watches, watch phones, mobile communication terminals, electronic notebooks, electronic books, portable multimedia players (PMPs), navigation systems and ultra mobile PCs (UMPCs).

For example, the display device 200 may be any of an organic light emitting display device, a liquid crystal display device, a plasma display device, a field emission display device, an electrophoretic display device, an electrowetting display device, a quantum dot light emitting display device, a micro LED display device, and the like. In the following, an organic light emitting display device will be described as an example of the display device 200, but the display device 200 is not limited thereto.

The display device 200 may include a first display substrate 210, a second display substrate 220 facing the first display substrate 210, and a filling layer 230 that connects the first display substrate 210 to the second display substrate 220.

The first display substrate 210 may include a first base substrate 211, a light emitting element EMD disposed on a surface of the first base substrate 211, and a thin film encapsulation layer 217 disposed on the light emitting element EMD.

The first base substrate 211 of the first display substrate 210 may be an insulating substrate. The first base substrate 211 may be a rigid substrate such as glass.

A circuit layer CCL for driving the light emitting element EMD may be disposed on the first base substrate 211. The circuit layer CCL may be disposed between the first base substrate 211 and a pixel electrode PXE to be described later.

The pixel electrode PXE may be disposed on the circuit layer CCL of the first display substrate 210. The pixel electrode PXE may be a first electrode (e.g., an anode electrode) of the light emitting device EMD.

A pixel defining layer PDL may be disposed on a surface of the first base substrate 211 along a pixel boundary. The pixel defining layer PDL may be disposed on the pixel electrode PXE and may include an opening to expose the pixel electrode PXE.

The light emitting layer EML may be disposed on the pixel electrode PXE exposed by the pixel defining layer PDL. The light emitting layer EML may include the organic light emitting layer, and in some cases, may further include a hole injection/transport layer and/or an electron injection/transport layer, as an auxiliary layer for assisting light emission. The wavelength of light emitted by each light emitting layer EML may be the same for each pixel. For example, the light emitting layer EML of each pixel may emit blue light or ultraviolet rays, and the second display substrate 220 to be described later may include a wavelength conversion layer WCL, thereby displaying a color for each pixel.

The common electrode CME may be disposed on the light emitting layer EML. The common electrode CME may be continuous across the pixels. The common electrode CME may be an entire electrode extended across all the pixels.

The common electrode CME may be a second electrode (e.g., a cathode electrode) of the light emitting element EMD.

The pixel electrode PXE, the light emitting layer EML, and the common electrode CME may constitute a light emitting element (e.g., an OLED). Although one pixel is illustrated in FIG. 2 to show one light emitting element EMD, the first display substrate 210 may include light emitting elements EMD arranged for each pixel.

The thin film encapsulation layer 217 may be dispose on the common electrode CME. The thin film encapsulation layer 217 may include a first inorganic layer 217a, an organic layer 217b disposed on the first inorganic layer 217a, and a second inorganic layer 217c disposed on the organic layer 217b.

The second display substrate 220 may be disposed above the thin film encapsulation layer 217 to face the first display substrate 210.

The second base substrate 221 of the second display substrate 220 may include a transparent insulating material such as glass or the like. The second base substrate 221 may be a rigid substrate.

A light blocking member BML may be disposed on a surface of the second base substrate 221 facing the first base substrate 211 along the pixel boundary. The light blocking member BML may overlap the pixel defining layer PDL of the first display substrate 210. The light blocking member BML may be formed in a grid pattern in plan view, and may include an opening that exposes a surface of the second base substrate 221.

A color filter layer CFL may be disposed on a surface of the second base substrate 221 where the light blocking member BML may be disposed. The color filter layer CFL may be disposed on a surface of the second base substrate 221 that may be exposed through the opening of the light blocking member BML.

The color filter layer CFL may include a colorant such as a dye or pigment that absorbs wavelengths other than the corresponding color wavelength. The color filter layer CFL may include a different colorant for each pixel.

A first capping layer 222 for preventing permeation of impurities such as moisture, air, or the like may be disposed on the color filter layer CFL.

A partition wall PTL may be disposed on the first capping layer 222. The partition wall PTL may be disposed to overlap the light blocking member BML. The partition wall PTL may include an opening that exposes the area where the color filter layer CFL may be disposed.

A wavelength conversion layer WCL may be disposed in the space exposed by the opening of the partition wall PTL. The wavelength conversion layer WCL may be, but is not necessarily, formed by an inkjet printing process using the partition wall PTL as a bank.

The wavelength conversion layer WCL may convert the wavelength of light incident from the light emitting layer EML. The wavelength conversion layer WCL may include a base resin BRS, and a scatterer SCP and a wavelength conversion material WCP disposed in the base resin BRS. The base resin BRS may include a transparent organic material. The wavelength conversion material WCP may be a quantum dot, a quantum rod, a phosphor, or the like.

A second capping layer 223 may be disposed on the wavelength conversion layer WCL and the partition wall PTL. In other words, the second capping layer 223 may be disposed on the entire surface of the second display substrate 220.

The filling layer 230 may be disposed between the first display substrate 210 and the second display substrate 220. The filling layer 230 may fill a space between the first display substrate 210 and the second display substrate 220, and may serve to bond the first display substrate 210 and the second display substrate 220 to each other.

A first protective film 100 may be disposed on a surface (bottom surface in FIG. 1) of the display device 200. The first protective film 100 may include a base film 110 and a film coating layer 120 disposed on a surface of the base film 110.

The base film 110 may protect a surface of the display device 200. The base film 110 may have the same shape as that of a surface of the display device 200 to which the base film 110 may be adhered to cover an entire surface of the display device 200. For example, the base film 110 may have a rectangular shape in plan view.

The base film 110 may include at least one selected from the group consisting of polyethylene terephthalate (PET), polyethylene naphthalate (PEN), polycarbonate (PC), polymethyl methacrylate (PMMA), polystyrene (PS), polyvinylchloride (PVC), polyethersulfone (PES), polyethylene (PE), polypropylene (PP), a TRF film, and a combination thereof, but is not limited thereto.

The film coating layer 120 may be disposed on a surface of the base film 110. The film coating layer 120 may have a non-slip property. The non-slip property of the film coating layer 120 may be, but not necessarily be, obtained by surface irregularities including protruding shapes and/or the elasticity of film beads 122 forming the protruding shapes.

The film coating layer 120 may include a film binder 121 and the film beads 122 distributed in the film binder 121.

The film binder 121 may be disposed to cover an entire surface of the base film 110. The film binder 121 may surround the film beads 122 to be described later and fix the film beads 122 on a surface of the base film 110.

The film binder 121 may include a flat portion 121a that may not be in contact with the film beads 122 to be described later and include a substantially flat surface, and protrusion portion 121b that may be in contact with the flat portion 121a and the film beads 122 and surround the film beads 122. The protrusion portion 121b may have a protruding shape due to the film beads 122 surrounded by the protrusion portion 121b. The protrusion portion 121b may be surrounded by the flat portion 121a. The average thickness of the protrusion portion 121b may be, but is not necessarily, smaller than the average thickness of the flat portion 121a.

The film binder 121 may include an acrylic polymer material. For example, the film binder 121 may include at least one selected from the group consisting of methyl methacrylate (MMA), butyl acrylate (BA), 2-hydroxyethyl methacrylate (2-HEMA), a combination thereof.

The film binder 121 may have a glass transition temperature of about 0° C. to about 25° C. The adhesive property of the film binder 121 may increase as the glass transition temperature decreases. However, in case that the glass transition temperature is excessively low, a phenomenon that a part of the film binder 121 may be stuck to a contact target may occur. In case that the glass transition temperature of the film binder 121 is about 0° C. or higher, such a phenomenon may be avoided. On the other hand, in case that the glass transition temperature of the film binder 121 is excessively high, the adhesive property may be decreased and, also, the hardness of the film binder 121 may be increased. The non-slip property of the film beads 122 may be affected by the elastic action of the film beads 122. As the hardness of the film binder 121 increases, the elastic action of the film beads 122 surrounded by the film binder 121 may be weakened, which may adversely affect the non-slip property. In case that the glass transition temperature of the film binder 121 is about 25° C. or lower, the increase in the hardness of the film binder 121 may be limited, which may make it possible to exhibit an improved non-slip effect.

The glass transition temperature of the film binder 121 may be controlled by adjusting the composition of the materials included in the film binder 121. For example, the film binder 121 having a glass transition temperature of about 0° C. to about 25° C. may be produced by mixing about 42 wt % to about 58 wt % of methyl methacrylate (MMA), about 37 wt % to about 53 wt % of butyl acrylate (BA), and about 4 wt % to about 6 wt % of 2-hydroxyethyl acrylate (2-HEMA).

Specifically, the film binder 121 produced by mixing about 42 wt % or more of methyl methacrylate (MMA), about 53 wt % or less of butyl acrylate (BA), and about 4 wt % to about 6 wt % of 2-hydroxyethyl acrylate (2-HEMA) may have a glass transition temperature of about 0° C. or higher.

Further, the film binder 121 produced by mixing about 58 wt % or less of methyl methacrylate (MMA), about 37 wt % or more of butyl acrylate (BA), and about 4 wt % to about 6 wt % of 2-hydroxyethyl acrylate (2-HEMA) may have a glass transition temperature of about 25° C. or lower.

The film beads 122 may be disposed (e.g., distributed irregularly) in the film binder 121. The external protruding shape of the film coating layer 120 may be formed by the film beads 122. As described above, the film beads 122 may be surrounded by the film binder 121. Specifically, the film beads 122 may not be exposed to the outside while being surrounded by the protrusion portion 121b of the film binder 121.

The average particle size of the film beads 122 may be about 5 μm to about 10 μm, but is not limited thereto. The average particle size of the film beads 122 may be greater than the average thickness of the film binder 121, i.e., the average thickness of the flat portion 121a and the protrusion portion 121b. Since the average particle size of the film beads 122 may be greater than the average thickness of the film binder 121, the protruding shape of the film coating layer 120 may be caused by the film beads 122.

However, the disclosure is not limited thereto, and the average thickness of the film binder 121 may be greater than the average particle size of the film beads 122. The thickness of the protrusion portion 121b of the film binder 121 may be greater than the average particle size of the film beads 122. In other embodiments, the film beads 122 may be stacked in the film binder 121.

The film beads 122 surrounded by the film binder 121 may be separated from the film binder 121 during the formation or the coating of the film coating layer 120. The film beads 122 separated from the film binder 121 themselves may become foreign materials and damage the tray (see '500' of FIG. 11) on which the film coating layer 120 may be disposed, the substrate, or the like.

The non-slip property of the loading target element 1 loaded on the tray 500 may be improved due to the film beads 122 and the protrusion portion 121b of the film binder 121 surrounding the film beads 122. The film beads 122 may have elasticity. Due to the elasticity of the film beads 122, the non-slip property and the frictional force between the protrusion portion 121b surrounding them and another component in contact with the protrusion portion 121b may be improved. Specifically, the film beads 122 may absorb the impact caused by an external force due to the elasticity thereof. Accordingly, when slip occurs due to the contact with another component, the film beads 122 may absorb and distribute the impact caused by the external force in relation to the non-slip property. The film beads 122 may be, e.g., urethane beads made of a urethane material, but are not limited thereto.

The film beads 122 may be included in the film coating layer 120 at a weight ratio of about 5 wt % to about 15 wt %, and in some embodiments, at a weight ratio of about 9 wt % to about 11 wt %.

In case that the content of the film beads 122 is about 9 wt % or more, a meaningful non-slip property of the film beads 122 may be exhibited. In case that the content of the film beads 122 is about 11 wt % or less, it may be helpful to prevent the phenomenon that the film beads 122 may not be surrounded by the film binder 121 or the film beads 122 may be separated from the film binder 121.

In some embodiments in which the glass transition temperature of the film binder 121 may be within a range of about 0° C. to about 25° C., it may be desirable that the film beads 122 may be included at a content of about 9 wt % to about 11 wt % with respect to the film coating layer 120. As described above, the adhesive property of the film binder 121 varies depending on the glass transition temperature. In case that the glass transition temperature is within a range of about 0° C. to about 25° C., the film binder 121 may have the adhesive property corresponding thereto. By setting the content of the film beads 122 to about 9 wt % or more under such conditions, it may be possible to ensure the non-slip property that may be improved by sufficient content of the film beads 122 having the elasticity within the corresponding adhesive property.

In case that the glass transition temperature of the film binder 121 is within a range of about 0° C. to about 25° C., if the film beads 122 have a weight ratio of about 11 wt % or less with respect to the film coating layer 120, it may be possible to prevent the film beads 122 surrounded by the film binder 121 from being separated from the film binder 121 and generating foreign materials.

A second protective film 300 may be disposed on another surface (top surface in FIG. 1) of the display device 200. The second protective film 300 may be adhered onto a surface of the display device 200 to protect the surface of the display device 200. The second protective film 300 may have the same shape as that of another surface of display device 200 to which the second protective film 300 may be adhered to cover an entire surface of the display device 200. For example, the second protective film 300 may have a rectangular shape in plain view.

The second protective film 300 may include at least one selected from the group of the materials included in the above-described base film 110 or a combination thereof. The second protective film 300 may include the same material as that of the base film 110, although not limited thereto.

The loading target element 1 may further include a first film adhesive layer 410 disposed between the display device 200 and the first protective film 100, and a second film adhesive layer 420 disposed between the display device 200 and the second protective film 300. The first film adhesive layer 410 may adhere the first protective film 100 onto a surface of the loading target element 1, and the second film adhesive layer 420 may adhere the second protective film 300 onto another surface of the loading target element 1.

The first and second film adhesive layers 410 and 420 may be made of an adhesive material such as at least one of an OCA adhesive, a PSA adhesive, or the like including an acrylic adhesive, a silicon adhesive, a urethane adhesive, a rubber adhesive, a vinyl ether adhesives, or the like, but are not limited thereto. Further, the first and second film adhesive layers 410 and 420 may be made of the same material.

In the following, the film coating layer 120 having the non-slip property will be described in detail using the loading target element 1 loaded on the tray 500.

Figure 4:
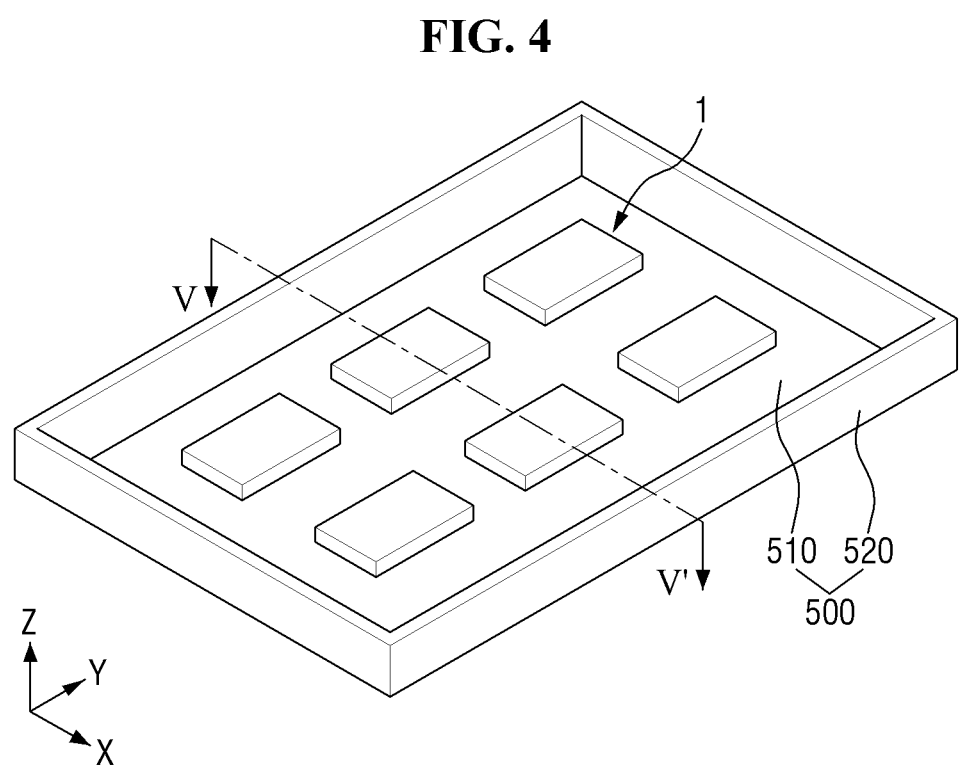
Figure 5:
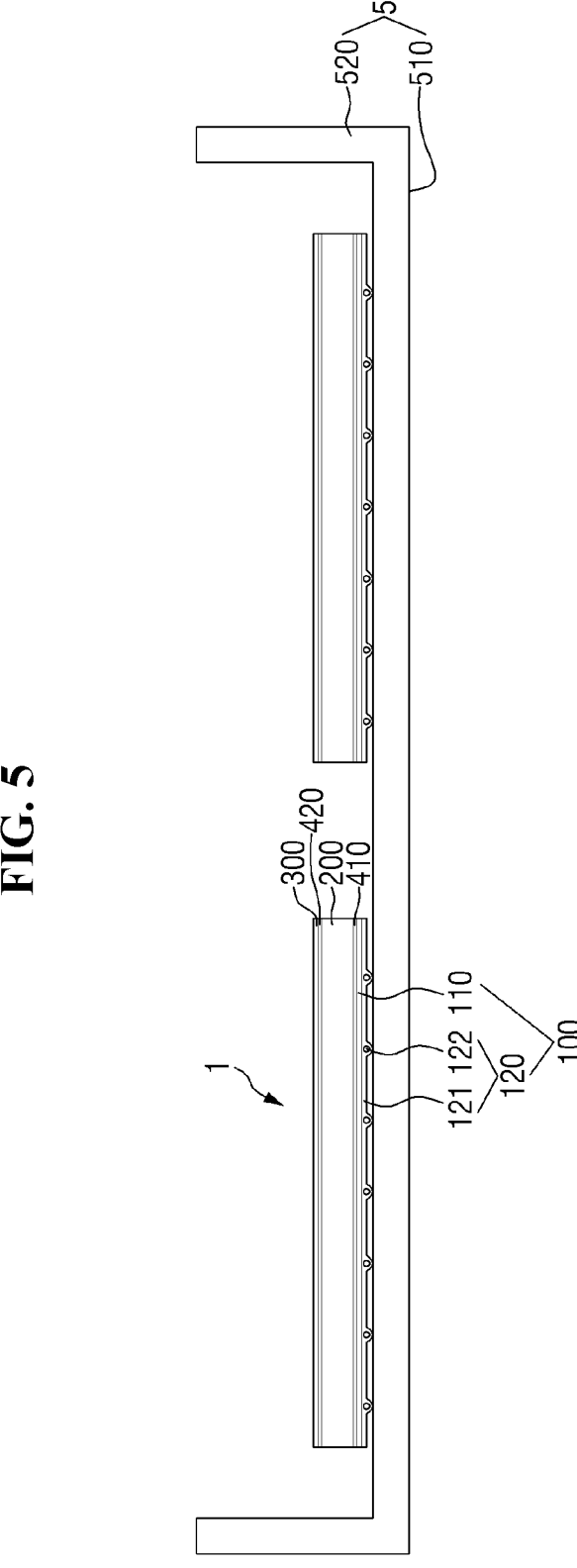
FIG. 5 is a schematic cross-sectional view taken along line V-V' of FIG. 4.
Figure 6:
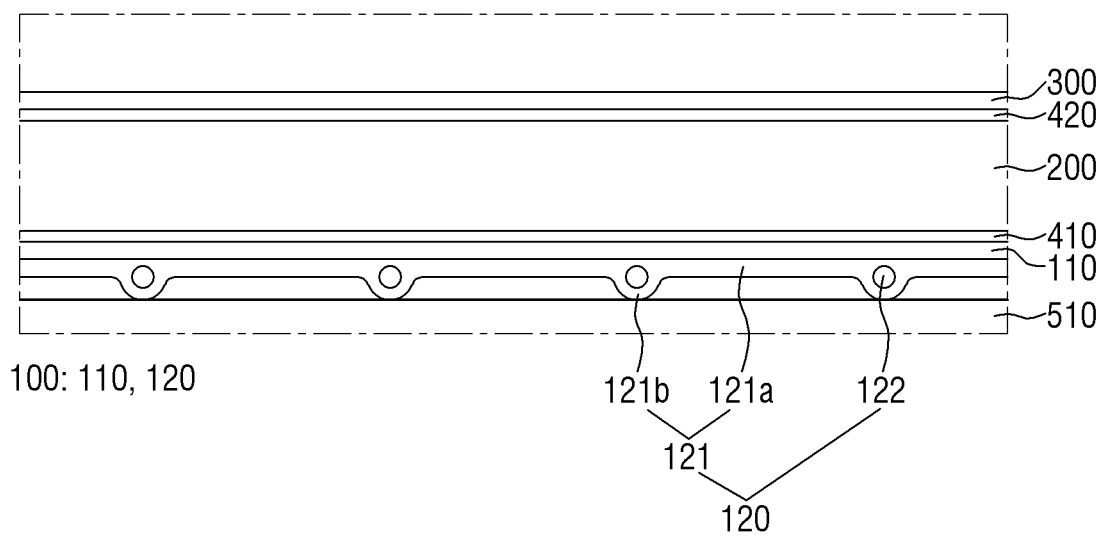
FIG. 6 is an enlarged schematic view of area Q of FIG. 5.

FIG. 4 is a schematic perspective view showing a state in which a loading target element according to an embodiment is loaded on a tray. FIG. 5 is a schematic cross-sectional view taken along line V-V' of FIG. 4. FIG. 6 is an enlarged schematic view of area Q of FIG. 5.

Referring to FIGS. 4 to 6, the tray 500 may include a bottom surface portion 510 and a sidewall portion 520 surrounding the bottom surface portion 510. The loading target element 1 may be loaded in the loading space of the tray 500 defined by the top surface of the bottom surface portion 510 and the inner side surface of the sidewall portion 520 of the tray 500. The loading target element 1 may be stored or transferred while being loaded in the loading space of the tray 500.

In an embodiment, loading target elements 1 may be mounted on a surface of the tray 500 forming the loading space. The loading target elements 1 may be positioned while being spaced apart from each other by a distance. Although FIG. 4 illustrates six loading target elements 1 arranged in a matrix structure of three columns in a first direction X and two rows in a second direction Y, the number of the loading target elements 1 arranged in the loading space is not limited thereto.

The bottom surface portion 510 of the tray 500 may extend to the film coating layer 120 of the first protective film 100 included in the loading target element 1. Specifically, the bottom surface portion 510 of the tray 500 may extend to the protrusion portion 121b of the film binder 121 included in the film coating layer 120.

Due to the frictional force between the bottom surface portion 510 of the tray 500 and the protrusion portion 121b of the film binder 121, the movement of the loading target element 1 in the loading space of the tray 500 may be restricted. Specifically, due to the elasticity of the film beads 122 surrounded by the protrusion portion 121b, the frictional force between the protrusion portion 121b surrounding the film beads 122 and the bottom surface portion 510 of the tray 500 may be improved. Therefore, a non-slip property of the loading target element 1 including the film coating layer 120 may be improved due to the film beads 122 and the protrusion portion 121b surrounding the film beads 122.

A non-slip property of the loading target element 1 may vary depending on the glass transition temperature of the film binder 121 of the film coating layer 120 and the content of the film beads 122 with respect to the film coating layer 120. In case that the film binder 121 has a glass transition temperature of about 0° C. to about 25° C. and the film beads 122 has a weight ratio of about 9 wt % to about 11 wt % with respect to the film coating layer 120, the loading target element 1 may have an excellent non-slip property.

Since the film coating layer 120 may have an excellent non-slip property with respect to the tray 500, it may be possible to prevent the movement of the loading target elements 1 even if the tray 500 has no boundary. Therefore, it may be possible to prevent a collision between the loading target elements 1 or collision between the loading target elements 1 and the tray 500. In other words, in case that the loading target element 1 is transferred while being loaded on the tray 500, the film coating layer 120 may provide an excellent non-slip property of the loading target element 1 with respect to the tray 500 to prevent the loading target element 1 from being moved and damaged.

Hereinafter, a method of producing the first protective film 100 including the film coating layer 120 according to an embodiment will be described with reference to FIGS. 7 to 9.

Figure 7:
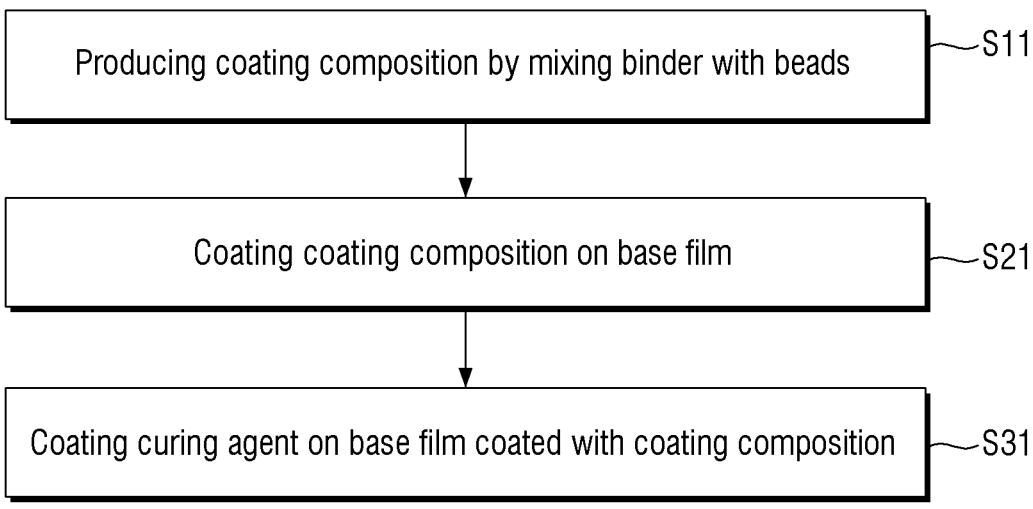
FIG. 7 is a flowchart schematically showing a method of producing a first protective film according to an embodiment.

FIG. 7 is a flowchart schematically showing a method of producing a first protective film according to an embodiment. FIGS. 8 and 9 are schematic views of the method of producing a first protective film according to an embodiment.

Referring to FIG. 7, the method of producing the first protective film 100 according to one embodiment may include a step S11 of producing a coating composition by mixing a binder with beads, a step S21 of coating the coating composition on a base film, and a step S31 of coating a curing agent on the base film coated with the coating composition.

Figure 8:
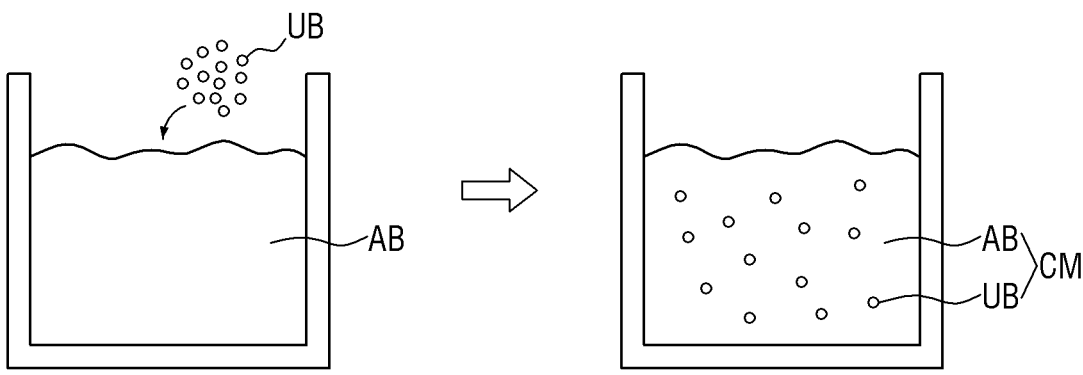

Referring to FIGS. 7 and 8, in order to produce the first protective film 100 according to one embodiment, first, the step S11 of producing a coating composition by mixing a binder with beads may be performed. A binder AB may be subjected to a subsequent step and become the film binder 121 of the first protective film 100, beads UB may be subjected to the subsequent step and become the film beads 122 of the first protective film 100.

The binder AB may include at least one selected from the group of methyl methacrylate (MMA), butyl acrylate (BA), 2-hydroxyethyl methacrylate (2-HEMA), and a combination thereof. The glass transition temperature of the binder AB may vary depending on the composition of the binder AB. The composition of the binder AB may be determined such that the glass transition temperature of the binder AB may be within a range of about 0° C. to about 25° C.

For example, the binder AB having the glass transition temperature of about 0° C. to about 25° C. may be produced by mixing about 42 wt % to about 58 wt % of methyl methacrylate (MMA), about 37 wt % to about 53 wt % of butyl acrylate (BA), and about 4 wt % to about 6 wt % of 2-hydroxyethyl acrylate (2-HEMA).

The beads UB may include a material having an elasticity. For example, the beads UB may be urethane beads including a urethane material, but is not limited thereto. The average particle size of beads UB may be about 5 μm to about 10 μm, but is not limited thereto.

In case that the binder AB is mixed with the beads UB, the beads UB may be distributed in the binder AB to produce a coating composition CM. The concentration of beads UB may be substantially the same for each region of the coating composition CM.

Figure 9:
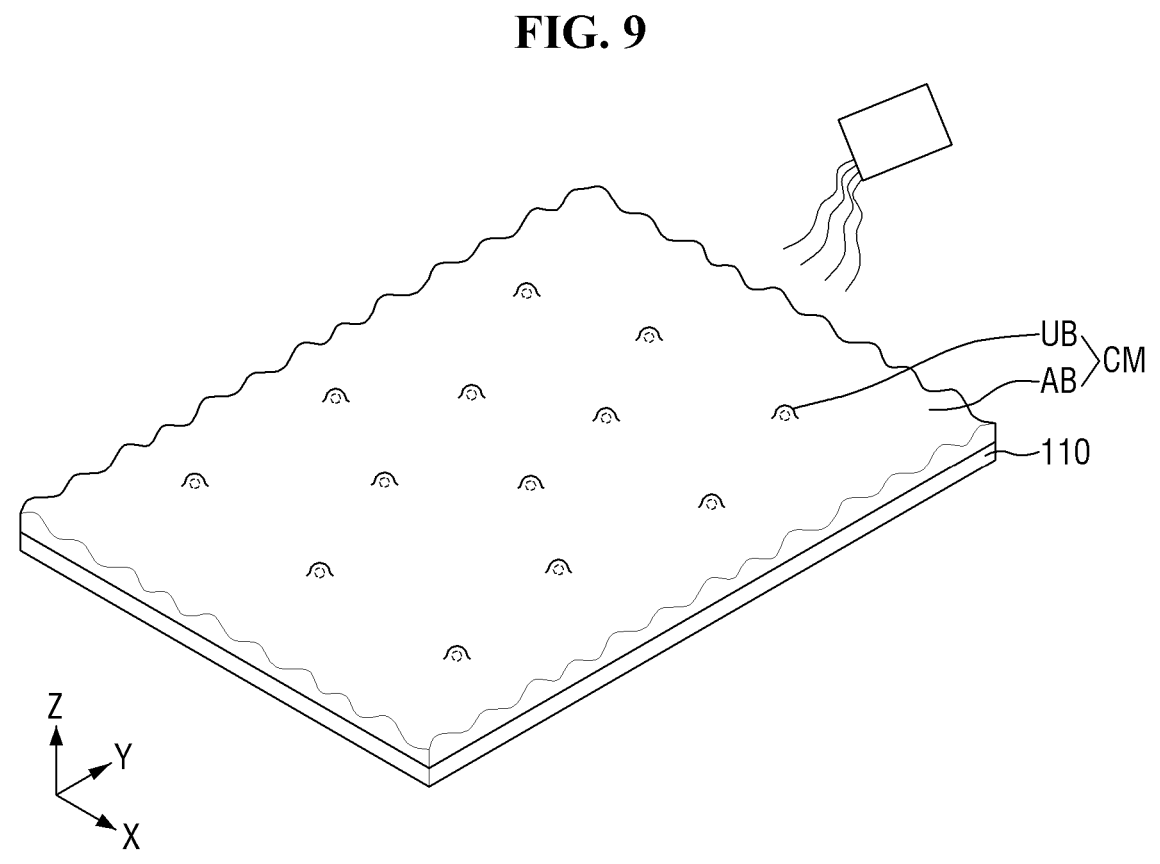

Referring to FIGS. 7 and 9, after the step S11 of producing a coating composition by mixing a binder with beads, the step S21 of coating the coating composition on the base film may be performed. The coating composition CM may be coated to cover an entire surface of the base film 110. The beads UB may be coated irregularly in the coating composition CM coated on the base film 110. The coating composition CM coated on the base film 110 may become the film coating layer 120 forming the first protective film 100 by the curing process to be performed later.

After the step S21 of coating the coating composition on the base film, the step S31 of coating the curing agent on the base film coated with the coating composition may be performed.

The curing agent may cure the binder AB included in the coating composition CM. By curing the binder AB, the flowability of the coating composition CM may be reduced and the binder AB and the beads UB may be fixed to the base film 110 to produce the film coating layer 120.

The curing agent may be a cross linking agent that may be bonded to at least one of various materials included in the binder AB. In one embodiment, the curing agent may include an isocyanate group (—N═C═O) that may form a urethane bond with 2-hydroxyethylcrylate (2-HEMA) in the binder AB. For example, the curing agent may include hexamethylene diisocyanate trimer (HDI Trimer), and the equivalent of the hexamethylene diisocyanate trimer (HDI Trimer) may be determined such that the ratio of the equivalent of a hydroxy group (—OH) and that of the isocyanate group (—N═C═O) may be 1:1.

By performing the step S31 of coating the curing agent on the base film 110 coated with the coating composition CM, the coating composition CM may be cured to form the film coating layer 120. In other words, the first protective film 100 in which the film coating layer 120 may be formed on the base film 110 may be formed.

Hereinafter, the non-slip property of the film coating layer 120 will be described in detail using Production Examples and Test Examples.

Production Examples 1-5: Production of Coating Composition

Production Example 1

An acrylic binder having a glass transition temperature of about 50° C. was produced by mixing methyl methacrylate (MMA), butyl acrylate (BA), and 2-hydroxyethyl methacrylate (2-HEMA) at a weight ratio of about 72:23:5, and mixed with urethane beads to produce the coating composition CM. The urethane beads were mixed at a weight ratio of about 10 wt % with respect to the coating composition CM.

Production Example 2

An acrylic binder having a glass transition temperature of about 25° C. was produced by mixing methyl methacrylate (MMA), butyl acrylate (BA), and 2-hydroxyethyl methacrylate (2-HEMA) at a weight ratio of about 58:37:5, and mixed with urethane beads to produce the coating composition CM. The urethane beads were mixed at a weight ratio of about 10 wt % with respect to the coating composition CM.

Production Example 3

An acrylic binder having a glass transition temperature of about 0° C. was produced by mixing methyl methacrylate (MMA), butyl acrylate (BA), and 2-hydroxyethyl methacrylate (2-HEMA) at a weight ratio of about 42:53:5, and mixed with urethane beads to produce the coating composition CM. The urethane beads were mixed at a weight ratio of about 10 wt % with respect to the coating composition CM.

Production Example 4

An acrylic binder having a glass transition temperature of about –25° C. was produced by mixing methyl methacrylate (MMA), butyl acrylate (BA), and 2-hydroxyethyl methacrylate (2-HEMA) at a weight ratio of about 22:73:5, and mixed with urethane beads to produce the coating composition CM. The urethane beads were mixed at a weight ratio of about 10 wt % with respect to the coating composition CM.

Production Example 5

An acrylic binder having a glass transition temperature of about –50° C. was produced by mixing methyl methacrylate (MMA), butyl acrylate (BA), and 2-hydroxyethyl methacry-late (2-HEMA) at a weight ratio of about 1:94:5, and mixed with urethane beads to produce the coating composition CM. The urethane beads were mixed at a weight ratio of about 10 wt % with respect to the coating composition CM.

Test Example 1: Evaluation of Non-Slip Property of Production Examples 1 to 5

Figure 10:
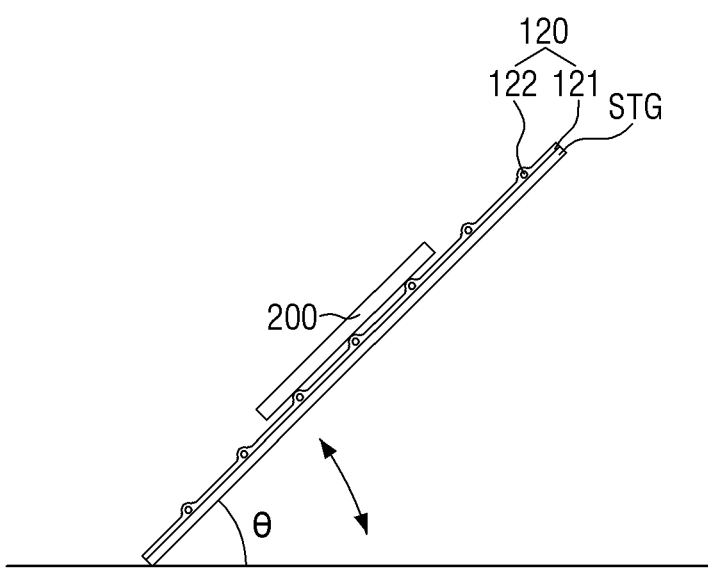
FIG. 10 schematically shows a test example for evaluating the non-slip property of a film coating layer according to an embodiment.

FIG. 10 schematically shows a test example for evaluat-ing the non-slip property of a film coating layer according to an embodiment.

Referring to FIG. 10, whether or not the display device 200 mounted on a stage STG having the film coating layer 120 formed thereon and having an inclination angle θ slips was observed. The film coating layer 120 was formed on the stage STG using the coating compositions CM of Production Examples 1 to 5. Specifically, the coating compositions CM of Production Examples 1 to 5 were coated on the stage STG and cured by a curing agent including hexamethylene dii-socyanate trimer (HDI Trimer) to form the film coating layer 120. In this test example, the inclination angle θ was set to 45°. The following table 1 shows the results of evaluating whether or not slip occurs in Production Examples.

TABLE 1

| | Production Example 1 | Production Example 2 | Production Example 3 | Production Example 4 | Production Example 5 |
|---|---|---|---|---|---|
| Composition (wt %) of Binder (MMA:BA:2-HEMA) | 72:23:5 | 58:37:5 | 42:53:5 | 22:73:5 | 1:94:5 |
| Glass transition temperature (° C.) of Binder | 50 | 25 | 0 | −25 | −50 |
| Content (wt %) of Urethane beads | 10 | 10 | 10 | 10 | 10 |
| Whether slip occurs | ○ | X | X | X | X |
| Whether coating composition is stuck | X | X | X | ○ | ○ |

In the case of forming the film coating layer 120 on the stage STG having the inclination angle θ of about 45° and evaluating whether or not slip occurs, when the film coating layer 120 was formed using Production Example 1 in which the glass transition temperature of the acrylic binder may be about 50° C., the phenomenon that the coating composition may be stuck to the display device 200 did not occur, but the display device 200 slipped.

When the film coating layer 120 was formed using Production Example 2 in which the glass transition tem-perature of the acrylic binder may be about 25° C. and Production Example 3 in which the glass transition tem-perature may be about 0° C., the display device 200 did not slip and the phenomenon that the coating composition may be stuck to the display device 200 did not occur, thereby exhibited an excellent non-slip property.

When the film coating layer 120 was formed using Production Example 4 in which the glass transition tem-perature of the acrylic binder may be about −25° C. and Production Example 5 in which the glass transition tem-perature of the acrylic binder may be about −50° C., the display device 200 did not slip, but the phenomenon that the coating composition may be stuck to the display device 200 occurred.

Therefore, it may be advantageous to use the acrylic binder having the glass transition temperature within a range of about 0° C. to about 25° C. in order to exhibit an excellent non-slip property and prevent the phenomenon that the coating composition may be stuck.

Hereinafter, a tray assembly TA including an anti-slip pad 600 having the same function as that of the film coating layer 120 will be described. In the following embodiments, descriptions of the same components as those previously described will be omitted or simplified, and differences will be described.

Figure 11:
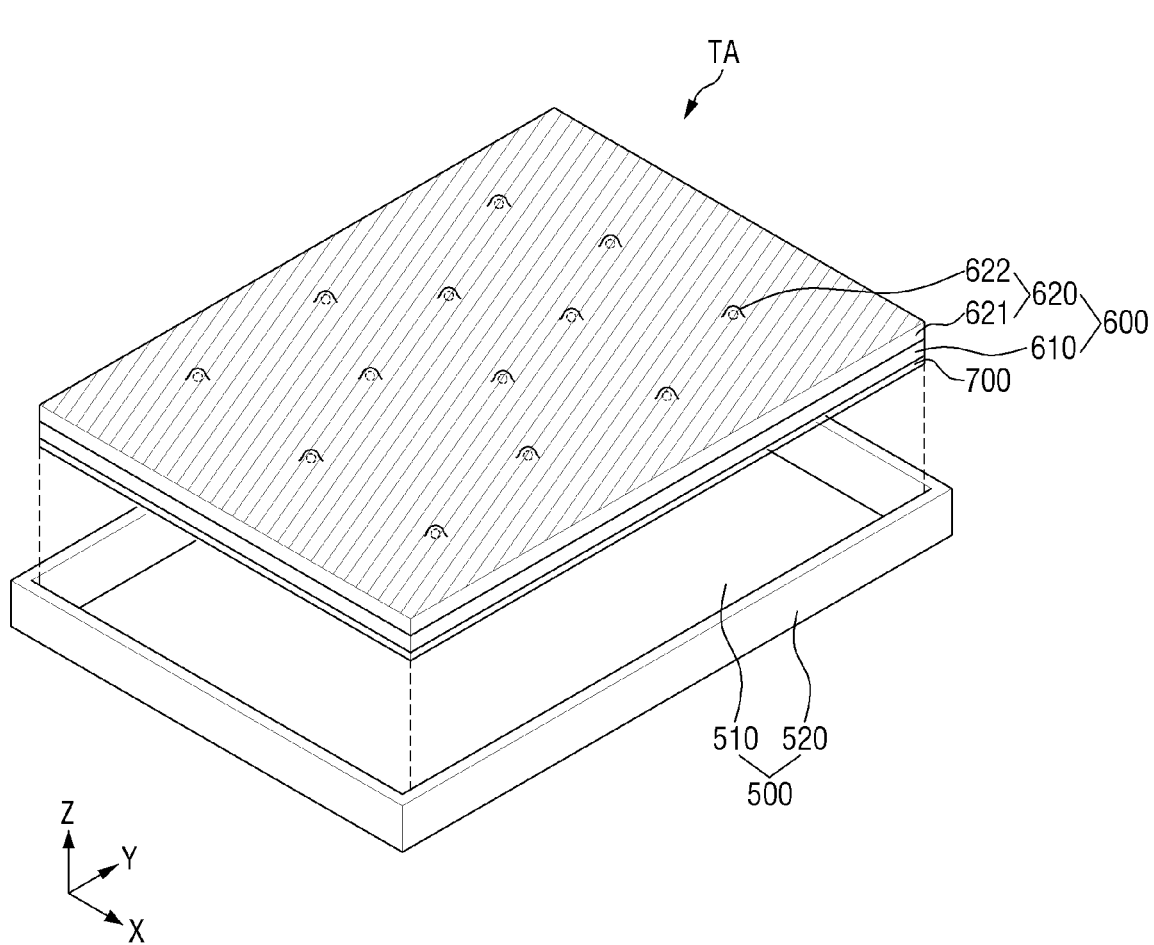
FIG. 11 is an exploded schematic perspective view showing a tray assembly according to an embodiment.
Figure 12:
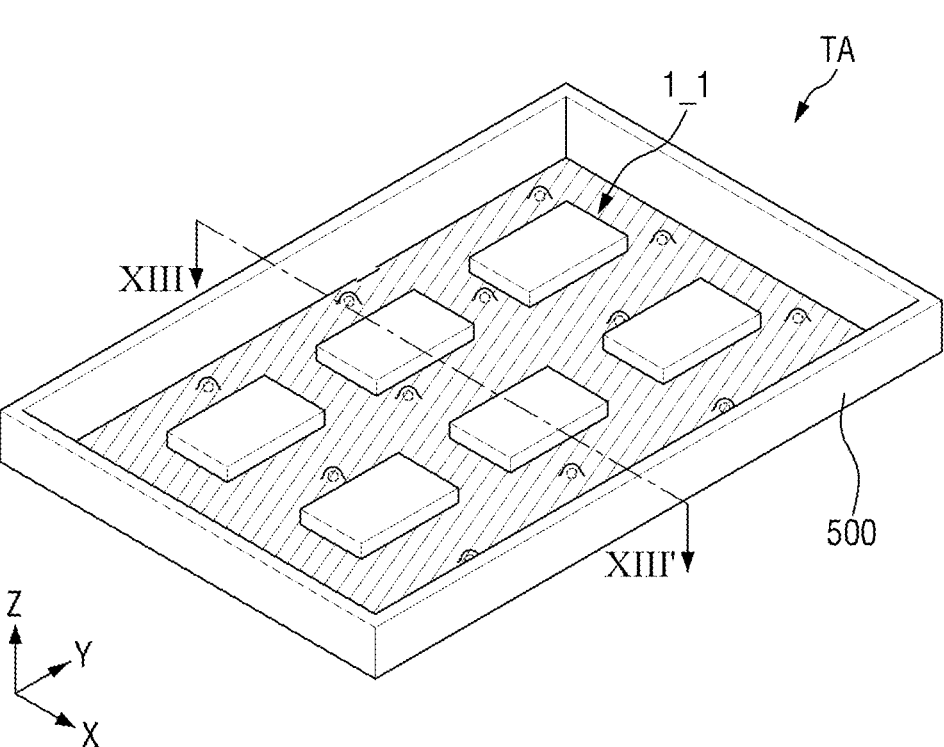
FIG. 12 is a schematic perspective view showing a state in which loading target elements are loaded on the tray assembly according to an embodiment.
Figure 13:
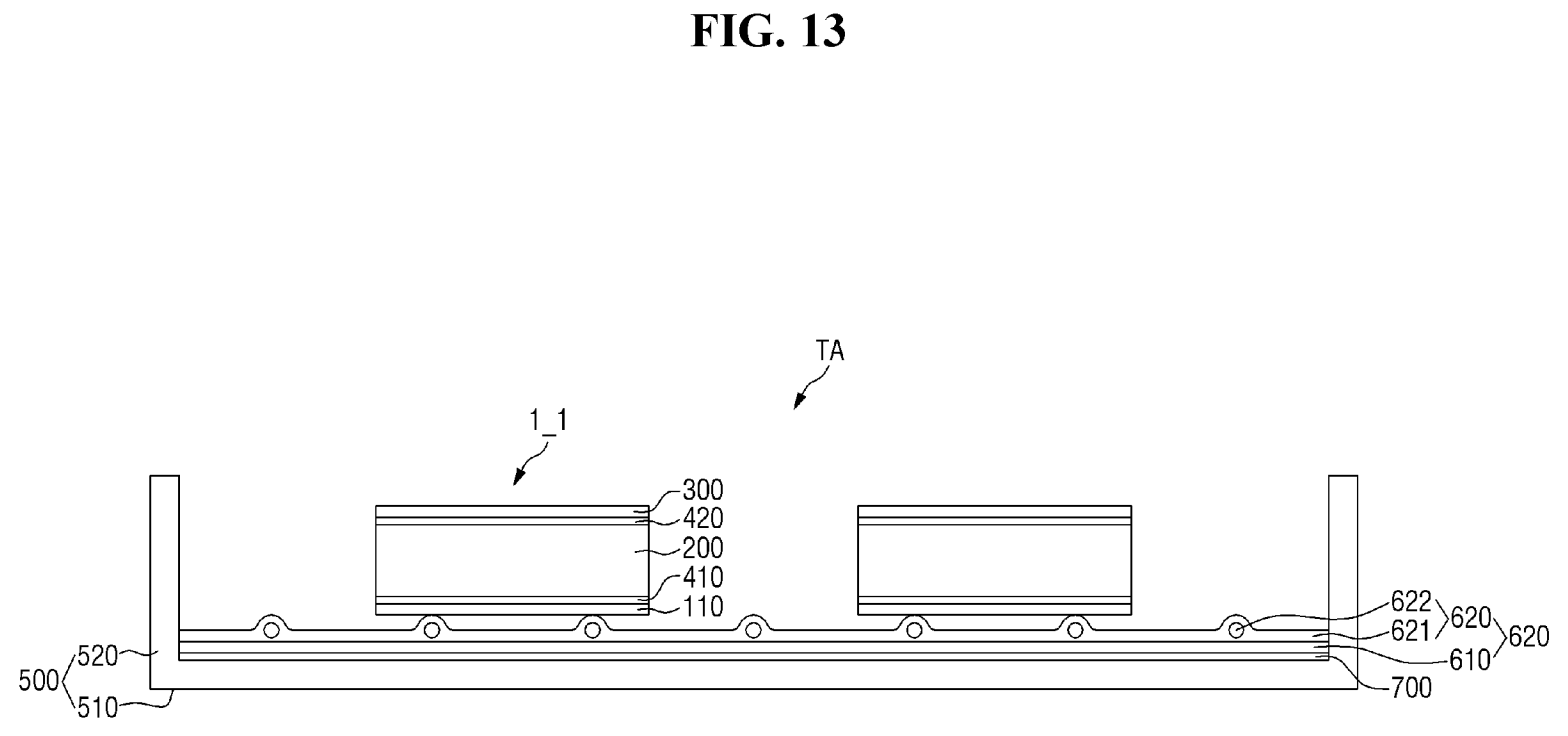

FIG. 11 is an exploded schematic perspective view show-ing a tray assembly according to an embodiment. FIG. 12 is a schematic perspective view showing a state in which loading target elements are loaded on the tray assembly according to an embodiment. FIG. 13 is a schematic cross-sectional view taken along line XIII-XIII' of FIG. 12.

Referring to FIGS. 11 to 13, the tray assembly TA according to an embodiment may include the tray 500 and the anti-slip pad 600 disposed on the tray 500. In an embodiment, the anti-slip pad 600 may be inserted into the tray 500 and separable from the tray 500.

Loading target elements 1_1 may be mounted on the anti-slip pad 600 of the tray assembly TA. In an embodi-ment, the loading target elements 1_1 may be different from the loading target element 1 described with reference to FIGS. 1 to 6 in that the film coating layer 120 may be omitted.

The loading target elements 1_1 may be positioned while being spaced apart from each other by a distance. The anti-slip pad 600 may provide a frictional force to the loading target elements 1_1 to prevent the movement of the loading target elements 1_1 even if there may be no bound-ary. Therefore, it may be possible to prevent collision between the loading target elements 1_1 or collision between the loading target elements 1_1 and the tray 500. In other words, in case that the loading target element 1_1 is transferred while being loaded on the tray assembly TA, the anti-slip pad 600 may provide a frictional force to the loading target element 1_1 to prevent the loading target element 1_1 from being moved and damaged.

The bottom surface of the anti-slip pad 600 may extend to the bottom surface portion 510 of the tray 500. Although the edge of the anti-slip pad 600 may extend to the sidewall portion 520 of the tray 500, the disclosure is not limited thereto, and the edge of the anti-slip pad 600 may be spaced apart from the sidewall portion 520 of the tray 500.

The anti-slip pad 600 according to one embodiment may include a base 610 and a pad coating layer 620 disposed on a surface of the base 610.

The base 610 may include a thermoplastic polymer resin. For example, the thermoplastic polymer resin may include at least one of polyester (PET A, PET G, PET G-PET A-PET G), styrene butadiene copolymer (SBC), acrylonitrile-buta-diene styrene (ABS), polystyrene (PS), polyimide (PI), polyamide, polysulfonate, polycarbonate, polyacrylate, polyvinyl chloride (PVC), polyethylene (PE), polypropylene (PP), modified polyphenylene oxide (M-PPO), a blend or copolymer thereof, phenol resin, epoxy resin, or urethane resin, but is not limited thereto.

The pad coating layer 620 may include a pad binder 621 and pad beads 622 distributed in the pad binder 621.

The pad binder 621 may be disposed to cover an entire surface of the base film 110. The pad binder 621 may surround the pad beads 622 to be described later and fix the pad beads 622 on a surface of the base 610. Since the description of the pad binder 621 and the pad beads 622 may be substantially the same as that of the film binder 121 and the film beads 122, additional description will be omitted.

The tray assembly TA according to one embodiment may further include a pad adhesive layer 700 disposed between the tray 500 and the anti-slip pad 600. The pad adhesive layer 700 may adhere the anti-slip pad 600 to the tray 500.

In accordance with the tray assembly TA according to an embodiment, the pad coating layer 620 of the anti-slip pad 600 may provide a frictional force to the loading target element 1 due to a non-slip property to prevent the movement of the loading target elements 1 even if there may be no boundary. Therefore, it may be possible to prevent collision between the loading target elements 1 or collision between the loading target elements 1 and the tray 500. In other words, in case that the loading target element 1 is transferred while being loaded on the tray 500, the pad coating layer 620 may provide a frictional force to the loading target element 1 to prevent the loading target element 1 from being moved and damaged.

Figure 14:
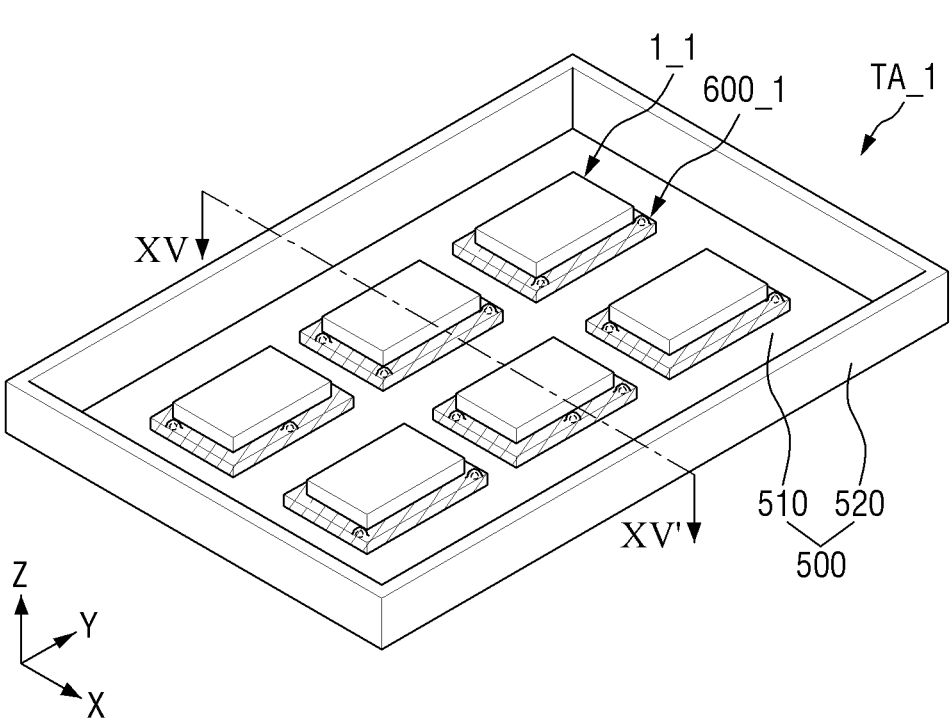
FIG. 14 is an exploded schematic perspective view showing a tray assembly according to another embodiment.
Figure 15:
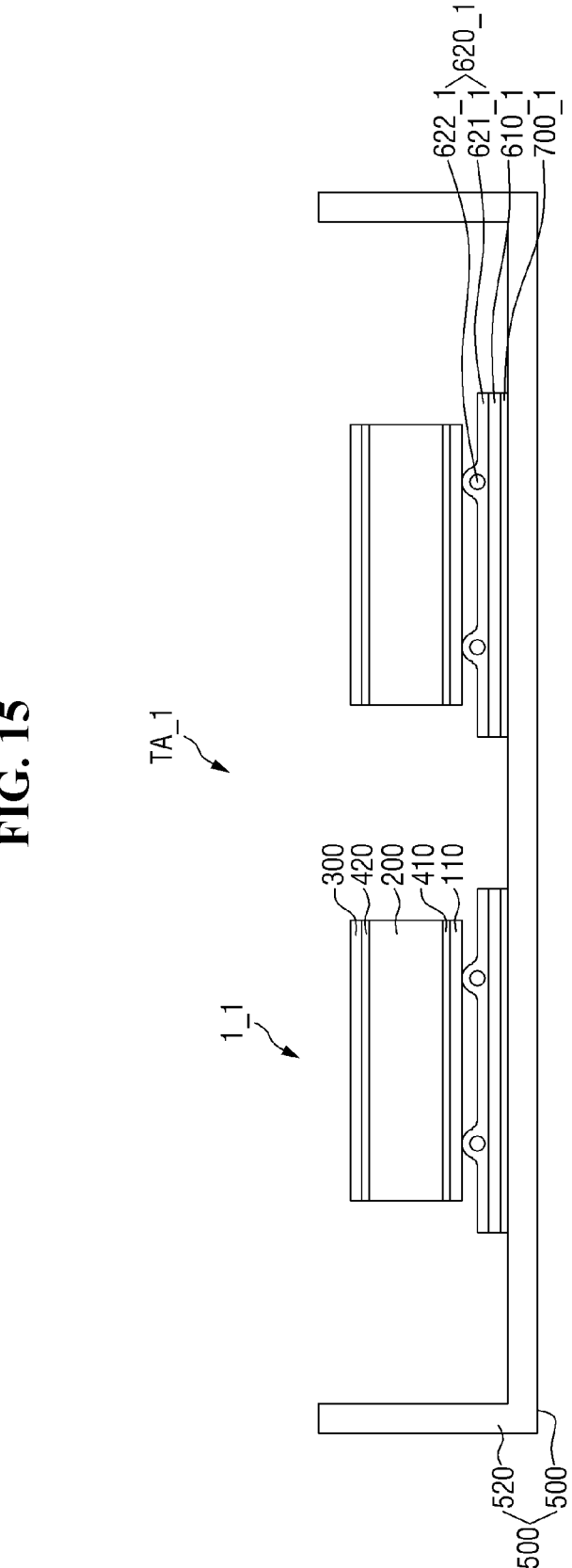
FIG. 15 is a schematic cross-sectional view taken along line XV-XV' of FIG. 14.

FIG. 14 is an exploded schematic perspective view showing a tray assembly according to another embodiment. FIG. 15 is a schematic cross-sectional view taken along line XV-XV' of FIG. 14.

Referring to FIGS. 14 and 15, a tray assembly TA_1 according to an embodiment may be different from the tray assembly TA according to one embodiment in that it may include an anti-slip pad 600_1 disposed only in a region where the loading target element 1 may be loaded. The tray assembly TA_1 according to an embodiment may include divided anti-slip pads 600_1. Although six anti-slip pads 600_1 arranged in two rows and three columns are illustrated in FIG. 14, the number and the arrangement of anti-slip pads 600 are not limited thereto.

Each anti-slip pad 600_1 may include a base 610_1 and a pad coating layer 620_1 disposed on the base 610_1.

The pad coating layer 620_1 may include a pad binder 621_1 and pad beads 622_1 distributed in the pad binder 621_1.

The area of each anti-slip pad 600_1 may be, but is not necessarily, greater than the area of the loading target element 1_1 loaded on the anti-slip pad 600_1. The anti-slip pads 600_1 may have the same area. However, the disclosure is not limited thereto and the anti-slip pads 600_1 may have different areas.

The tray assembly TA_1 according to an embodiment may further include the tray 500 and a pad adhesive layer 700_1 disposed on the anti-slip pad 600_1. The pad adhesive layer 700_1 may adhere the tray 500 and the anti-slip pad 600_1 to each other. The area of a surface of the pad adhesive layer 700_1 may be, but is not necessarily, equal to the area of a surface of the anti-slip pad 600_1.

In accordance with the tray assembly TA_1 according to an embodiment, the loading target element 1_1 may be stably loaded due to the anti-slip pad 600_1 including the pad coating layer 620_1 having a high friction coefficient with respect to the loading target element 1_1.

In the tray assembly TA_1 according to an embodiment, the anti-slip pads 600_1 may be disposed only in a region where the loading target elements 1_1 may be disposed, so that the non-slip property of the loading target elements 1_1 may be exhibited with a small number of anti-slip pads 600_1.

Figure 16:
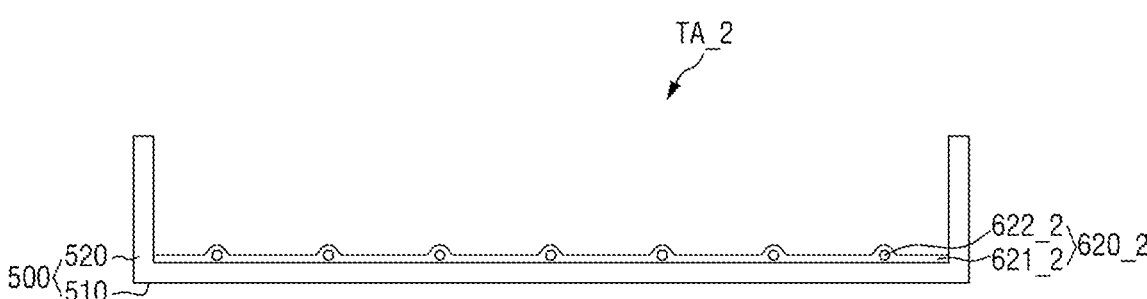
FIG. 16 is a schematic cross-sectional view of a tray assembly according to still another embodiment.

FIG. 16 is a schematic cross-sectional view of a tray assembly according to still another embodiment.

Referring to FIG. 16, a tray assembly TA_2 according to an embodiment may be different from the tray assembly TA according to one embodiment in that the base 610 may be omitted and the pad coating layer 620_2 (including 621_2 and 622_2) may be directly disposed on the tray 500. In other words, the tray assembly TA_2 according to an embodiment may include the tray 500 and the pad coating layer 620_2 disposed on the tray 500.

The tray assembly TA_2 according to an embodiment includes the non-slip pad 600 having a high friction coefficient with respect to the loading target element 1_1, so that it may be possible to stably load the loading target element 1_1.

The tray assembly TA_2 having a non-slip property according to an embodiment may be fabricated simply by directly coating the pad coating layer 620_2 on the tray 500.

In concluding the detailed description, those skilled in the art will appreciate that many variations and modifications can be made to the embodiments without substantially departing from the principles of the disclosure. Therefore, the disclosed embodiments are used in a generic and descriptive sense only and not for purposes of limitation.

What is claimed is:

1. A tray assembly comprising:
   a tray; and
   a plurality of coating layers disposed on the tray, wherein
   each of the plurality of coating layers includes:
     a binder; and
     a plurality of beads disposed in the binder, and
   the binder includes:
     a protrusion portion in contact with each of the beads; and
     a flat portion not in contact with the beads, wherein
   the plurality of beads are spaced apart from each other such that no two of the plurality of beads are in contact with each other on an outer surface of the binder,
   each of the plurality of coating layers are spaced apart from each other,
   the binder includes at least one of methyl methacrylate, butyl acrylate, and 2-hydroxyethyl methacrylate, and
   with respect to a total weight of the binder,
     the methyl methacrylate has a weight ratio of about 42 wt % to about 58 wt %,
     the butyl acrylate has a weight ratio of about 37 wt % to about 53 wt %, and
     the 2-hydroxyethyl methacrylate has a weight ratio of about 4 wt % to about 6 wt %.

2. The tray assembly of claim 1, wherein the plurality of beads form a pattern of unequally spaced rows and columns on the outer surface of the binder.

3. A tray assembly comprising:
   a tray; and
   a plurality of coating layers disposed on the tray, wherein
   each of the plurality of coating layers includes:
     a binder; and
     a plurality of beads disposed in the binder, and
   the binder includes:
     a protrusion portion in contact with each of the beads; and a flat portion not in contact with the beads, wherein the plurality of beads are spaced apart from each other such that no two of the plurality of beads are in contact with each other on an outer surface of the binder, each of the plurality of coating layers are spaced apart from each other, and a weight ratio of the beads to the coating layer is about 9 wt % to about 11 wt %.

4. The tray assembly of claim 3, wherein the beads include urethane beads.

\* \* \* \* \*